US012167523B2

(12) United States Patent
Taurino et al.

(10) Patent No.: US 12,167,523 B2
(45) Date of Patent: Dec. 10, 2024

(54) INDUCTIVELY HEATABLE CARTRIDGE FOR AN AEROSOL-GENERATING SYSTEM AND AN AEROSOL-GENERATING SYSTEM COMPRISING AN INDUCTIVELY HEATABLE CARTRIDGE

(71) Applicant: Philip Morris Products S.A., Neuchatel (CH)

(72) Inventors: Irene Taurino, Neuchatel (CH); Ihar Nikolaevich Zinovik, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 689 days.

(21) Appl. No.: 17/262,950

(22) PCT Filed: Jul. 31, 2019

(86) PCT No.: PCT/EP2019/070701

§ 371 (c)(1),
(2) Date: Jan. 25, 2021

(87) PCT Pub. No.: WO2020/025708

PCT Pub. Date: Feb. 6, 2020

(65) Prior Publication Data

US 2021/0329748 A1 Oct. 21, 2021

(30) Foreign Application Priority Data

Jul. 31, 2018 (EP) .................................... 18186708

(51) Int. Cl.

*H05B 6/10* (2006.01)
*A24F 40/10* (2020.01)

(Continued)

(52) U.S. Cl.

CPC ............. *H05B 6/108* (2013.01); *A24F 40/10* (2020.01); *A24F 40/30* (2020.01); *A24F 40/42* (2020.01);

(Continued)

(58) Field of Classification Search

CPC ....... H05B 6/108; H05B 1/0297; A24F 40/10; A24F 40/30; A24F 40/42; A24F 40/465; A24F 40/20; A24B 15/167; A24B 15/243

See application file for complete search history.

(56) References Cited

U.S. PATENT DOCUMENTS

2015/0245669 A1 9/2015 Cadieux et al.
2017/0311648 A1 11/2017 Gill et al.

(Continued)

FOREIGN PATENT DOCUMENTS

CN 107105779 A 8/2017
CN 108289511 A 7/2018

(Continued)

OTHER PUBLICATIONS

International Search Report and Written Opinion issued Oct. 25, 2019 in PCT/EP2019/070701 filed Jul. 31, 2019.

(Continued)

*Primary Examiner* — Jean F Duverne

(74) *Attorney, Agent, or Firm* — Oblon, McClelland, Maier & Neustadt, L.L.P.

(57) ABSTRACT

A cartridge for an aerosol-generating system is provided, the cartridge including: a first compartment having a first air inlet and a first air outlet, and containing a nicotine source including a first carrier material impregnated with nicotine; and a second compartment having a second air inlet and a second air outlet, and containing an acid source including a second carrier material impregnated with an acid, one of the first and the second compartments including a pair of (Continued)

susceptor elements being arranged in contact with the first and the second carrier materials, respectively, within the first and the second compartments, respectively, and the first and the second carrier materials being respectively arranged between the pair of susceptor elements.

12 Claims, 7 Drawing Sheets

(51) Int. Cl.

| | |
|---|---|
| ***A24F 40/30*** | (2020.01) |
| ***A24F 40/42*** | (2020.01) |
| ***A24F 40/465*** | (2020.01) |
| ***H05B 1/02*** | (2006.01) |

(52) U.S. Cl.

CPC ......... *A24F 40/465* (2020.01); *H05B 1/0297* (2013.01)

(56) References Cited

U.S. PATENT DOCUMENTS

| | | | |
|---|---|---|---|
| 2018/0027883 | A1 | 2/2018 | Zuber et al. |
| 2018/0029782 | A1 | 2/2018 | Zuber et al. |
| 2018/0168226 | A1 | 6/2018 | Mironov et al. |
| 2018/0184713 | A1 | 7/2018 | Mironov et al. |

FOREIGN PATENT DOCUMENTS

| | | | | |
|---|---|---|---|---|
| JP | 2017-525422 A | 9/2017 | | |
| JP | 2018-502587 A | 2/2018 | | |
| KR | 10-2017-0020800 A | 2/2017 | | |
| RU | 2015 142 984 A | 4/2017 | | |
| RU | 2015 154 108 A | 6/2017 | | |
| WO | WO 2008/121610 A1 | 10/2008 | | |
| WO | WO 2015/177043 A1 | 11/2015 | | |
| WO | WO 2017/001819 A1 | 1/2017 | | |
| WO | WO 2017/005471 A1 | 1/2017 | | |
| WO | WO-2017029268 A1 * | 2/2017 | ............. | A24F 40/30 |
| WO | WO 2017/068100 A1 | 4/2017 | | |
| WO | WO 2017/088099 A1 | 4/2017 | | |
| WO | WO 2017/108987 A1 | 6/2017 | | |
| WO | WO 2017/108991 A1 | 6/2017 | | |
| WO | WO 2017/108992 A1 | 6/2017 | | |

OTHER PUBLICATIONS

Combined Russian Office Action and Search Report issued Nov. 17, 2022, in corresponding Russian Patent Application No. 2021103690 (with English Translation), 11 pages.

Japanese Office Action issued Aug. 28, 2023 in Japanese Patent Application No. 2021-504511 (with English Translation), 5 pages.

Office Action issued Jan. 17, 2024, in corresponding Korean Patent Application No. 10-2021-7001337 (with English Translation), 10 pages.

Combined Chinese Office Action and Search Report issued Sep. 15, 2023 in Chinese Patent Application No. 201980045667.4 (with English Translation), 13 pages.

Office Action issued Sep. 25, 2024, in corresponding Korean Patent Application No. 10-2021-7001337 (with English translation), citing documents 1 and 15 therein, 4 pages.

* cited by examiner

INDUCTIVELY HEATABLE CARTRIDGE FOR AN AEROSOL-GENERATING SYSTEM AND AN AEROSOL-GENERATING SYSTEM COMPRISING AN INDUCTIVELY HEATABLE CARTRIDGE

The disclosure relates to a cartridge for use in an aerosol-generating system and an aerosol-generating system comprising such a cartridge. In particular, the disclosure relates to a cartridge assembly comprising a nicotine source and an acid source for use in an aerosol-generating system for the in situ generation of an aerosol comprising nicotine salt particles and an aerosol-generating system comprising such a cartridge.

Devices for delivering nicotine to a user which generate an inhalable aerosol from a liquid aerosol-forming substrate containing nicotine and one or more aerosol formers are known. Such devices typically comprise a reservoir storing the liquid aerosol-forming substrate, a heater for vaporising the liquid aerosol-forming substrate to generate an aerosol and a liquid transport element for supplying the substrate to the heater. A known configuration for such devices comprises a liquid transport element in the form of a capillary wick, having a portion extending into a reservoir of the substrate and a portion extending out of the reservoir, and a heater in the form of an electrically resistive coil that is wound around the portion of the capillary wick that extends out of the reservoir. These devices typically generate an aerosol by vapourising a small aliquot of the substrate stored in the reservoir by raising the temperature of the heater to a high temperature, at or above the boiling point of the substrate, for a relatively short amount of time, such as a few seconds, to rapidly vaporise a small aliquot of the substrate from the reservoir. This type of heating may be referred to as "flash" heating. In devices employing "flash" heating, puff detection may also be employed such that the heater may be heated to the high temperature only when a user draws or puffs on the device.

Devices for delivering nicotine to a user comprising a nicotine source and a volatile delivery enhancing compound source are also known. For example, WO 2008/121610 A1 and WO 2017/108992 A1 disclose devices in which nicotine and an acid, such as pyruvic acid or lactic acid, are reacted with one another in the gas phase to form an aerosol of nicotine salt particles that is inhaled by the user.

Systems comprising a separate acid source and nicotine source do not typically require "flash" heating to vapourise an aliquot of the sources to generate an aerosol, rather when a user puffs or draws on the device aliquots of the nicotine and acid sources are drawn from the carrier materials in gaseous form as air is drawn through the first and second chambers, due to the change in pressure in the chambers. The aliquots of nicotine and acid are reacted with one another in the gas phase to form an aerosol of nicotine salt particles.

Differences between the vapour concentrations of nicotine and the acid in such devices may disadvantageously lead to an unfavorable reaction stoichiometry or the delivery of excess reactant, such as unreacted nicotine vapour or unreacted acid vapour to a user. To control and balance the vapour concentrations of nicotine and acid to yield an efficient reaction stoichiometry, it has been proposed to heat the nicotine and acid in devices of the type disclosed in WO 2008/121610 A1. Several configurations for heating the nicotine and acid have been proposed. One proposal comprises providing one or more electrically resistive heating elements in close proximity to the chambers holding the nicotine and acid. Another such proposal comprises providing an inductively heatable susceptor element between the chambers holding the nicotine and acid.

It has been found that raising the temperature of a source within a chamber can take a significant amount of time, such as up to 30 seconds or longer. Furthermore, since it is necessary to heat one or both of the sources to temperature before a user takes a first puff on the device in order to control the vapour concentrations for the first puff, the "time to first puff" for such systems can be up to 30 seconds or longer.

In most aerosol-generating systems it is desirable to generate aerosol with the desired constituents as soon as possible after activation of the device. For a satisfactory consumer experience of an aerosol-generating device the "time to first puff" is considered to be critical. Consumers do not want to have to wait for a significant period following activation of the device before taking a first puff.

It would be desirable to provide an aerosol-generating system comprising a nicotine source and an acid source for the in situ generation of an aerosol comprising nicotine salt particles that enables the nicotine source and the acid source to be heated rapidly and uniformly. It would also be desirable to provide an aerosol-generating system comprising a nicotine source and an acid source for the in situ generation of an aerosol comprising nicotine salt particles that facilitates consistent release of nicotine vapour from the nicotine source and acid vapour from the acid source over time. It would further be desirable to provide an aerosol-generating system comprising a nicotine source and an acid source for the in situ generation of an aerosol comprising nicotine salt particles that facilitates a short or minimal "time to first puff".

According to the disclosure there is provided a cartridge for use in an aerosol-generating system, the cartridge comprising: a first compartment having a first air inlet and a first air outlet, the first compartment containing a nicotine source comprising a first carrier material impregnated with nicotine; and a second compartment having a second air inlet and a second air outlet, the second compartment containing an acid source comprising a second carrier material impregnated with an acid, wherein one of the first and second compartments comprises a susceptor element arranged in contact with the carrier material within the compartment.

In particular, according to the disclosure there is provided a cartridge for use in an aerosol-generating system, the cartridge comprising: a first compartment having a first air inlet and a first air outlet, the first compartment containing a nicotine source comprising a first carrier material impregnated with nicotine; and a second compartment having a second air inlet and a second air outlet, the second compartment containing an acid source comprising a second carrier material impregnated with an acid, wherein one of the first and second compartments comprises a pair of susceptor elements arranged in contact with the carrier material within the compartment, and wherein the carrier material is arranged between the pair of susceptor elements.

The cartridge is for use in an aerosol-generating system. The aerosol-generating system may comprise an aerosol-generating device, the cartridge being configured to be used with the device. Preferably, the device comprises a device housing; an inductor coil positioned on or within the housing; and a power supply connected to the inductor coil and configured to provide an oscillating current to the inductor coil. Preferably, the oscillating current is a high frequency oscillating current. As used herein, a high frequency oscillating current means an oscillating current having a frequency of between 500 kHz and 30 MHz. The high frequency oscillating current may have a frequency of between 1 and 30 MHz, preferably between 1 and 10 MHz and more preferably between 5 and 7 MHz.

In operation, the oscillating current is passed through the inductor coil to generate an alternating magnetic field that induces a voltage in the susceptor element. The induced voltage causes a current to flow in the susceptor element and this current causes Joule heating of the susceptor element that in turn heats source in the chamber in which the susceptor element is located. Because the susceptor element is ferromagnetic, hysteresis losses in the susceptor element also generate a significant amount of heat.

An aerosol-generating system using inductive heating has the advantage that no electrical contacts need be formed between the cartridge and the device in order to supply power to the heater. The susceptor element need not be electrically joined to any other components, eliminating the need for solder or other bonding elements. This is particularly advantageous for the arrangement of the present disclosure, wherein the susceptor element is arranged within one of the compartments of the cartridge, in contact with the carrier material in the compartment. Furthermore, the inductor coil is provided as part of the device making it possible to construct a cartridge that is simple, inexpensive and robust. Cartridges are typically disposable articles produced in much larger numbers than the devices with which they operate. Accordingly reducing the cost of cartridges, even if it requires a more expensive device, can lead to significant cost savings for both manufacturers and consumers.

Advantageously, the inventors have realised that arranging a susceptor element within a compartment of the cartridge, in contact with the carrier material of the source contained within the compartment, significantly reduces the time required to raise the temperature of the source within the compartment to a desired temperature. The time required to raise the temperature of the source within the compartment to the desired temperature may be referred to herein as the "pre-heating time". In some configurations, the inventors have found that the "pre-heating time" may be reduced to about 5 seconds or less by positioning a susceptor element within the chamber and in contact with the carrier material of the source within the chamber.

It is believed that the reduction in the "pre-heating time" required to heat the nicotine and acid sources to the desired temperature results from the contact between the susceptor element and the carrier material enabling conduction of heat directly from the susceptor material to the nicotine source or the acid source. This provides a direct heat transfer pathway between the source and the heater compared to systems having a heater arranged outside of the compartments. It is also believed that the arrangement of the susceptor element within the container enables air and vapour in the chamber to come into contact with the susceptor, improving the transfer of heat from the susceptor and the air and vapour.

Advantageously, the inventors have also realised that arranging a susceptor element within a compartment of the cartridge, in contact with the carrier material of the source contained within the compartment, facilitates maintenance of the nicotine and acid sources at the desired temperature over time. It is believed that the improved transfer of heat to air entering the chamber may help to maintain the temperature of the chamber at a steady state over time, even during puffing by a user.

The aerosol-generating system may be required to heat one or more of the nicotine source and the acid source to any suitable desired temperature. The desired temperature may be a temperature that results in the heated source having desired properties, such as a particular desired viscosity or surface temperature. Preferably, the desired temperature is below the boiling point of the source.

The aerosol-generating system may be configured to heat at least one of the first compartment and the second compartment of the cartridge to a desired temperature. The system may be configured to heat at least one of the first compartment and the second compartment to a desired temperature by any suitable configuration of the susceptor, inductor coil, power supply and electronics. For example, the dimensions and number of turns of the inductor coil, the dimensions and material of the susceptor and the power supplied to the inductor coil may be selected according to the desired temperature that the system.

The aerosol-generating system may be configured to heat both the first compartment and the second compartment to a desired temperature. The system may be configured to heat the first compartment to a first desired temperature and to heat the second compartment to a second desired temperature. In some preferred embodiments, the first desired temperature may be substantially the same as the second desired temperature. In some embodiments, the first desired temperature may be different from the second desired temperature.

Preferably, the aerosol-generating system is configured to heat at least one of the first compartment and the second compartment of the cartridge to a temperature of below about 250 degrees Celsius. Preferably, the heater is configured to heat the first compartment and the second compartment of the cartridge to a temperature of between about 80 degrees Celsius and about 150 degrees Celsius.

As used herein with reference to the disclosure, by "substantially the same temperature" it is meant that the difference in temperature between the first compartment and the second compartment of the cartridge measured at corresponding locations relative to the centre of the compartment is less than about 3° C.

In use, heating one or both of the first compartment and the second compartment of the cartridge to a temperature above ambient temperature advantageously enables the vapour concentrations of the nicotine in the first compartment of the cartridge and the vapour pressure of acid in the second compartment of the cartridge to be controlled and balanced proportionally to yield an efficient reaction stoichiometry between the nicotine and the acid. Advantageously, this may improve the efficiency of the formation of nicotine salt particles and the consistency of delivery to a user. Advantageously, it may also reduce the delivery of unreacted nicotine and unreacted acid to a user.

It has been found that a target temperature of around 100 degrees Celsius to around 110 degrees Celsius is a desirable target temperature to heat one or more of the nicotine and acid sources to yield an efficient reaction stoichiometry.

As used herein, a "susceptor element" means a conductive element that heats up when subjected to a changing magnetic field. This may be the result of eddy currents induced in the susceptor element and/or hysteresis losses.

The material and the geometry of the susceptor element can be chosen to provide a desired electrical resistance and heat generation.

Possible materials for the susceptor elements include graphite, molybdenum, silicon carbide, stainless steels, niobium, aluminium and virtually any other conductive elements. The susceptor element may be a ferrous element. The susceptor element may be a ferrite element. The susceptor element may be a stainless steel element. The susceptor element may be a ferritic stainless steel element. Suitable susceptor materials include 410, 420 and 430 stainless steel. Advantageously, it has been found that arranging a susceptor element comprising ferritic stainless steel within either of the chambers, in contact with the carrier material of the nicotine source or the acid source, does not result in the transfer of the susceptor material from the susceptor element into the aerosol generated by the system.

The susceptor element may comprise an outer surface which is chemically inert. Chemically inert is understood herein to mean with respect to at least one of the nicotine of the nicotine source and the acid of the acid source when heated to the temperature by the susceptor element. The susceptor element may comprise an outer surface which is chemically inert to the nicotine of the nicotine source. The susceptor element may comprise an outer surface which is chemically inert to the acid of the acid source.

The susceptor element may comprise an electrically conductive susceptor material that is chemically inert. In other words, the chemically inert surface may be a chemically inert outer surface of the susceptor material itself.

The chemically inert outer surface may be a protective external layer. The susceptor element may have a protective external layer, for example a protective ceramic layer or protective glass layer covering or enclosing the susceptor element. The susceptor element may comprise a protective coating formed by a glass, a ceramic, or an inert metal, formed over a core of susceptor material. Advantageously, providing the susceptor element with a chemically inert outer surface may inhibit or prevent unwanted chemical reactions from occurring between the susceptor element and the nicotine of the nicotine source and the acid of the acid source. A protective external layer or coating material may withstand temperatures as high as the susceptor material is heated.

The material of the susceptor element may be chosen because of its Curie temperature. Above its Curie temperature a material is no longer ferromagnetic and so heating due to hysteresis losses no longer occurs. In the case the susceptor element is made from one single material, the Curie temperature may correspond to a maximum temperature the susceptor element should have (that is to say the Curie temperature is identical with the maximum temperature to which the susceptor element should be heated or deviates from this maximum temperature by about 1-3%). This reduces the possibility of rapid overheating.

If the susceptor element is made from more than one material, the materials of the susceptor element can be optimized with respect to further aspects. For example, the materials can be selected such that a first material of the susceptor element may have a Curie temperature which is above the maximum temperature to which the susceptor element should be heated. This first material of the susceptor element may then be optimized, for example, with respect to maximum heat generation and transfer to the nicotine or acid source to provide for an efficient heating of the susceptor on one hand. However, the susceptor element may then additionally comprise a second material having a Curie temperature which corresponds to the maximum temperature to which the susceptor should be heated, and once the susceptor element reaches this Curie temperature the magnetic properties of the susceptor element as a whole change. This change can be detected and communicated to a microcontroller which then interrupts the generation of AC power until the temperature has cooled down below the Curie temperature again, whereupon AC power generation can be resumed.

At least a portion of the susceptor element may be fluid permeable. As used herein a "fluid permeable" element means an element that allowing liquid or gas to permeate through it. The susceptor element may have a plurality of openings formed in it to allow fluid to permeate through it. In particular, the susceptor element allows the source material, in either gaseous phase or both gaseous and liquid phase, to permeate through it.

The susceptor element may take any suitable form. The susceptor element may comprise, for example, a mesh, flat spiral coil, fibres or a fabric. In some embodiments, the susceptor element may comprises a sheet or a strip.

In some preferred embodiments, the susceptor element may comprise a mesh. As used herein the term "mesh" encompasses grids and arrays of filaments having spaces therebetween. The term mesh also includes woven and non-woven fabrics.

The filaments may define interstices between the filaments and the interstices may have a width of between 10 micrometres and 100 micrometres. Preferably the filaments give rise to capillary action in the interstices, so that in use, the source liquid is drawn into the interstices, increasing the contact area between the susceptor element and the liquid.

The filaments may form a mesh of size between 160 and 600 Mesh US (+/−10%) (i.e. between 160 and 600 filaments per inch (+/−10%)). The width of the interstices is preferably between 75 micrometres and 25 micrometres. The percentage of open area of the mesh, which is the ratio of the area of the interstices to the total area of the mesh is preferably between 25 and 56%. The mesh may be formed using different types of weave or lattice structures. Alternatively, the filaments consist of an array of filaments arranged parallel to one another.

The filaments may be formed by etching a sheet material, such as a foil. This may be particularly advantageous when the heater assembly comprises an array of parallel filaments. If the heating element comprises a mesh or fabric of filaments, the filaments may be individually formed and knitted together.

The mesh may also be characterised by its ability to retain liquid, as is well understood in the art.

The filaments of the mesh may have a diameter of between 8 micrometres and 100 micrometres, preferably between 8 micrometres and 50 micrometres, and more preferably between 8 micrometres and 39 micrometres.

The filaments of the mesh may have any suitable cross-section. For example, the filaments may have a round cross section or may have a flattened cross-section.

Advantageously, the mesh susceptor element may have a relative permeability between 1 and 40000. When a reliance on eddy currents for a majority of the heating is desirable, a lower permeability material may be used, and when hysteresis effects are desired then a higher permeability material may be used. Preferably, the material has a relative permeability between 500 and 40000. This provides for efficient heating.

In some preferred embodiments, the susceptor element is a ferrous mesh susceptor element. The mesh susceptor element may be a stainless steel mesh susceptor element. The mesh susceptor element may be a ferritic stainless steel mesh susceptor element. The mesh susceptor element may comprise a plurality of stainless steel filaments. The mesh susceptor element may comprise a plurality of ferritic stainless steel filaments.

In embodiments where the acid of the acid source and the nicotine of the nicotine source are liquid, the liquid may form a meniscus in interstices of the mesh susceptor element provides for efficient heating of the nicotine and the acid.

In some preferred embodiments, the susceptor comprises a pair of susceptor elements. In these preferred embodiments, the carrier material may be arranged between the pair of susceptor elements. Preferably, at least one of the pair of susceptor elements is a mesh susceptor element. In some embodiments each of the susceptor elements of the pair of susceptor elements are mesh susceptor elements.

In some preferred embodiments, the first chamber comprises a first susceptor in contact with the first carrier material and the second chamber comprises a second susceptor in contact with the second carrier material.

In some particularly preferred embodiments, the first susceptor comprises a first pair of susceptor elements, wherein the first carrier material is arranged between the first pair of susceptor elements, and the second susceptor comprises a second pair of susceptor elements, wherein the second carrier material is arranged between the second pair of susceptor elements. In some of the particularly preferred embodiments, one or more of the susceptor elements is a mesh susceptor element. In some of the particularly preferred embodiments, each of the susceptor elements is a mesh susceptor element.

Preferably, in embodiments comprising more than one susceptor element in the cartridge, one or more of the susceptor elements is a mesh susceptor element. More preferably all of the susceptor elements are mesh susceptor elements. Advantageously, providing one or more of the susceptor elements as a mesh susceptor element may facilitate even heating of the susceptor elements. Each susceptor element in the cartridge has an electromagnetic shielding effect on the other susceptor elements in the cartridge, and it is believed that a mesh susceptor element has a reduced electromagnetic shielding effect on the other susceptor elements compared to a non-porous or impermeable susceptor element.

Advantageously, the first compartment of the cartridge contains a nicotine source comprising a first carrier material impregnated with nicotine.

As used herein with reference to the disclosure, the term “nicotine”, is used to describe nicotine, nicotine base or a nicotine salt. In embodiments in which the first carrier material is impregnated with nicotine base or a nicotine salt, the amounts of nicotine recited herein are the amount of nicotine base or amount of ionised nicotine, respectively.

The first carrier material may be impregnated with liquid nicotine or a solution of nicotine in an aqueous or non-aqueous solvent.

The first carrier material may be impregnated with natural nicotine or synthetic nicotine.

Advantageously, the second compartment of the cartridge contains an acid source comprising a second carrier material impregnated with acid.

The acid source may comprise an organic acid or an inorganic acid.

Preferably, the acid source comprises an organic acid, more preferably a carboxylic acid, most preferably an alpha-keto or 2-oxo acid or lactic acid.

Advantageously, the acid source comprises an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid, lactic acid and combinations thereof. Advantageously, the acid source comprises pyruvic acid or lactic acid. More advantageously, the acid source comprises lactic acid.

The first carrier material and the second carrier material may be the same or different.

Advantageously, the first carrier material and the second carrier material have a density of between about 0.1 grams/cubic centimetre and about 0.3 grams/cubic centimetre.

Advantageously, the first carrier material and the second carrier material have a porosity of between about 15 percent and about 55 percent.

The first carrier material and the second carrier material may have any suitable structure. The first carrier material and the second carrier material are porous materials. The first and second carrier materials may have any suitable capillarity and porosity so as to be used with different liquid physical properties. The first carrier material and the second carrier material may have a fibrous or spongy structure. The first carrier material and the second carrier material may comprise sponge-like or foam-like material. The first and second carrier materials may comprise any suitable material or combination of materials. Examples of suitable materials are a sponge or foam material, ceramic- or graphite-based materials in the form of fibres or sintered powders, foamed metal or plastics materials, a fibrous material, for example made of spun or extruded fibres, such as cellulose acetate, polyester, or bonded polyolefin, polyethylene, terylene or polypropylene fibres, nylon fibres or ceramic. The first carrier material and the second carrier material may comprise one or more of glass, cellulose, ceramic, stainless steel, aluminium, polyethylene (PE), polypropylene, polyethylene terephthalate (PET), poly(cyclohexanedimethylene terephthalate) (PCT), polybutylene terephthalate (PBT), polytetrafluoroethylene (PTFE), expanded polytetrafluoroethylene (ePTFE), and BAREX®.

In embodiments comprising a mesh susceptor element, the carrier material may extend into interstices in the mesh susceptor element.

In some embodiments, at least one of the acid and nicotine are liquid held in capillary material. The capillary material preferably comprises a bundle of capillaries. For example, the capillary material may comprise a plurality of fibres or threads or other fine bore tubes. The fibres or threads may be generally aligned to convey liquid to the heater. The structure of the capillary material forms a plurality of small bores or tubes, through which the liquid can be transported by capillary action. The liquid has physical properties, including but not limited to viscosity, surface tension, density, thermal conductivity, boiling point and vapour pressure, which allow the liquid to be transported through the capillary material by capillary action. The capillary material may be configured to convey the liquid to the susceptor element.

The first carrier material acts as a reservoir for the nicotine.

Advantageously, the first carrier material is chemically inert with respect to nicotine.

The first carrier material may have any suitable shape and size. For example, the first carrier material may be in the form of a sheet or plug.

Advantageously, the shape and of the first carrier material may be similar to the shape and size of the first compartment of the cartridge.

The shape, size, density and porosity of the first carrier material may be chosen to allow the first carrier material to be impregnated with a desired amount of nicotine.

Advantageously, the first compartment of the cartridge contains a nicotine source comprising a first carrier material impregnated with between about 1 milligram and about 40 milligram of nicotine.

Preferably, the first compartment of the cartridge contains a nicotine source comprising a first carrier material impregnated with between about 3 milligram and about 30 milligram of nicotine. More preferably, the first compartment of the cartridge contains a nicotine source comprising a first carrier material impregnated with between about 6 milligram and about 20 milligram of nicotine. Most preferably, the first compartment of the cartridge contains a nicotine source comprising a first carrier material impregnated with between about 8 milligram and about 18 milligram of nicotine.

Advantageously, the first compartment of the cartridge may further comprise a flavourant. Suitable flavourants include, but are not limited to, menthol. The first carrier material may be impregnated with the nicotine and a flavourant. Advantageously, the first carrier material may be impregnated with between about 3 milligrams and about 12 milligrams of flavourant.

The second carrier material acts as a reservoir for the acid.

Advantageously, the second carrier material is chemically inert with respect to the acid.

The second carrier material may have any suitable shape and size. For example, the second carrier material may be in the form of a sheet or plug.

Advantageously, the shape and size of the second carrier material may be similar to the shape and size of the second compartment of the cartridge.

The shape, size, density and porosity of the second carrier material may be chosen to allow the second carrier material to be impregnated with a desired amount of acid.

Advantageously, the second compartment of the cartridge contains a lactic acid source comprising a second carrier material impregnated with between about 2 milligrams and about 60 milligrams of lactic acid.

Preferably, the second compartment of the cartridge contains a lactic acid source comprising a second carrier material impregnated with between about 5 milligrams and about 50 milligrams of lactic acid. More preferably, the second compartment of the cartridge contains a lactic acid source comprising a second carrier material impregnated with between about 8 milligrams and about 40 milligrams of lactic acid. Most preferably, the second compartment of the cartridge contains a lactic acid source comprising a second carrier material impregnated with between about 10 milligrams and about 30 milligrams of lactic acid.

The susceptor element is in contact with the carrier material. The susceptor element may contact the carrier material in any suitable manner.

In some embodiments, the susceptor element may be arranged in the compartment with the carrier material such that at least a portion of the susceptor element is in abutment or direct physical contact with at least a portion of the carrier material. In these embodiments, the shape and size of the compartment, the carrier material and the susceptor element may be chosen to maintain abutment or direct physical contact between the susceptor element and the carrier material within the compartment.

In some embodiments, the susceptor element may be coated on the carrier material. The susceptor element may be coated on the carrier material by any suitable means. For example, the susceptor element may be sprayed, dipped onto the carrier material.

In some embodiments, the susceptor element may be secured to the carrier material by an adhesive layer. The adhesive layer between the susceptor element and the carrier material may be a porous layer. In these embodiments, the susceptor element is indirectly in contact with the carrier material, via the adhesive layer.

In some preferred embodiments, the material for forming the susceptor element is deposited directly onto the carrier material to form the susceptor element. Advantageously, by depositing the material for forming the susceptor element directly onto the porous outer surface of the carrier material may improve contact between the susceptor element and the carrier material. Additionally, by forming the susceptor element by depositing the material for forming the susceptor element directly onto the porous outer surface of the carrier material, the susceptor element is adhered to the carrier material.

As used herein, the term “deposited” means applied as a coating on the outer surface of the carrier material, for example in the form of a liquid, plasma or vapour which subsequently condenses or aggregates to form the susceptor element, rather than simply being laid on the carrier material as a solid, pre-formed component.

As used herein, the term “deposited directly” means that the material for forming the susceptor element is deposited onto the porous outer surface of the carrier material such that the at least one heating element is in direct contact with the porous outer surface.

As used herein, the term “porous” means formed from a material that is permeable to the liquid nicotine substrate and the liquid acid substrate and allows the liquid substrate to migrate through it.

In certain preferred embodiments, the material of the susceptor element is at least partially diffused into the porous outer surface of the carrier material.

As used herein, the term “diffused into the porous outer surface” means that the susceptor material is embedded in, or intermingled with, the material of the porous outer surface at the interface between the susceptor material and the carrier material, for example by extending into the pores of the porous outer surface.

The material from which the susceptor element is formed may be deposited onto the porous outer surface in any suitable manner. For example, the susceptor material may be deposited onto the porous outer surface of the carrier material as a liquid using a dispensing pipette or syringe, or using a fine-tipped transferring device such as a needle.

In some embodiments, the susceptor element comprises a printable susceptor material printed on the porous outer surface of the carrier material. In such embodiments, any suitable known printing technique may be used. For example, one or more of screen-printing, gravure printing, flex-printing, inkjet printing. Such printing processes may be particularly applicable for high speed production processes.

In some embodiments, material from which the susceptor element is formed may be deposited onto the porous outer surface of the carrier material by one or more vacuum deposition processes, such as evaporation deposition and sputtering.

The susceptor element may take any suitable form.

The tubular susceptor element may circumscribe or substantially circumscribe the carrier material. In some embodiments, the susceptor element may form a tubular susceptor element. Where the carrier material is elongate, having a length, the tubular susceptor element may circumscribe or substantially circumscribe the carrier material along the entire length of the carrier material or along substantially the entire length of the carrier material. The tubular susceptor element may be a mesh susceptor element.

In embodiments comprising a mesh susceptor element, the mesh susceptor element may substantially enclose the carrier material. The susceptor element may enclose the carrier material.

In some embodiments, the susceptor element covers or overlays or substantially overlays one side of the carrier material. For example, where the carrier material is substantially cuboidal, the carrier material may cover or overlie one side or surface of the cuboid. Where a pair of susceptor elements are provided in a chamber, a first one of the pair of susceptor elements may cover a first side of the carrier material and a second one of the pair of susceptor elements may cover a second side of the carrier material, opposite the first side. In preferred embodiments comprising a pair of susceptor elements in a chamber, at least one of the susceptor elements is a mesh susceptor element and more preferably both susceptor elements of the pair of susceptor elements are mesh susceptor elements.

In some embodiments, the susceptor element covers or overlays the surface of the carrier material at one side of the carrier material. Preferably, the susceptor element covers or overlays an area of between about 5% and about 100% of a side of the carrier material, between about 10% and about 80% of a side of the carrier material, between about 20% and about 70% of a side of the carrier material or between about 30% and about 60% of a side of the carrier material.

The susceptor element may cover an area of at least 10% of the surface of the carrier material. The susceptor element may cover an area of at least 20%, at least 30%, at least 40%, at least 50%, at least 60%, at least 70% or at least 80% of the surface of the carrier material. As used herein, the term "surface" refers to the macroscopic surface, such as the outer surface of a non-porous body.

In embodiments comprising a mesh susceptor element, the mesh or array of electrically conductive filaments may cover or overlay an area of between about 5% and about 100% of the surface of the carrier material, between about 10% and about 80% of the surface of the carrier material, between about 20% and about 70% of the surface of the carrier material or between about 30% and about 60% of the surface of the carrier material.

Preferably the cartridge comprises a housing. The cartridge housing may be configured to engage with a device housing when the cartridge is received by a device. The susceptor element may be provided on or adjacent to a wall of the cartridge housing that is configured to be positioned adjacent the inductor coil when the cartridge housing is engaged with the device housing. In use, it is advantageous to have the susceptor element close to the inductor coil in order to maximise the voltage induced in the susceptor element.

In some embodiments, the first compartment and the second compartment are arranged in series within the cartridge.

In some preferred embodiments, the first compartment and the second compartment are arranged in parallel within the cartridge. The first compartment and the second compartment may be arranged symmetrically with respect to each other within the cartridge.

As used herein with reference to the disclosure, by "parallel" it is meant that the first compartment and the second compartment are arranged within the cartridge so that in use a first air stream drawn through the cartridge passes into the first compartment through the first air inlet, downstream through the first compartment and out of the first compartment through the first air outlet and a second air stream drawn through the cartridge passes into the second compartment through the second air inlet, downstream through the second compartment and out of the second compartment through the second air outlet. Nicotine vapour is released from the nicotine source in the first compartment into the first air stream drawn through the cartridge and acid vapour is released from the acid source in the second compartment into the second air stream drawn through the cartridge. The nicotine vapour in the first air stream reacts with the acid vapour in the second air stream in the gas phase to form an aerosol of nicotine salt particles.

As used herein with reference to the disclosure, the terms "proximal", "distal", "upstream" and "downstream" are used to describe the relative positions of components, or portions of components, of the cartridge and aerosol-generating system.

The aerosol-generating system according to the disclosure comprises a proximal end through which, in use, an aerosol of nicotine salt particles exits the aerosol-generating system for delivery to a user. The proximal end may also be referred to as the mouth end. In use, a user draws on the proximal end of the aerosol-generating system in order to inhale an aerosol generated by the aerosol-generating system. The aerosol-generating system comprises a distal end opposed to the proximal end.

When a user draws on the proximal end of the aerosol-generating system, air is drawn into the aerosol-generating system, passes through the cartridge and exits the aerosol-generating system at the proximal end thereof. Components, or portions of components, of the aerosol-generating system may be described as being upstream or downstream of one another based on their relative positions between the proximal end and the distal end of the aerosol-generating system.

The first air outlet of the first compartment of the cartridge is located at the proximal end of the first compartment of the cartridge. The first air inlet of the first compartment of the cartridge is located upstream of the first air outlet of the first compartment of the cartridge. The second air outlet of the second compartment of the cartridge is located at the proximal end of the second compartment of the cartridge. The second air inlet of the second compartment of the cartridge is located upstream of the second air outlet of the second compartment of the cartridge.

As used herein with reference to the disclosure, the term "longitudinal" is used to describe the direction between the proximal end and the opposed distal end of the cartridge or aerosol-generating system and the term "transverse" is used to describe the direction perpendicular to the longitudinal direction.

As used herein with reference to the disclosure, the term "length" is used to describe the maximum longitudinal dimension of components, or portions of components, of the cartridge or aerosol-generating system parallel to the longitudinal axis between the proximal end and the opposed distal end of the cartridge or aerosol-generating system.

As used herein with reference to the disclosure, the terms "height" and "width" are used to describe the maximum transverse dimensions of components, or portions of components, of the cartridge or aerosol-generating system perpendicular to the longitudinal axis of the cartridge or aerosol-generating system. Where the height and width of components, or portions of components, of the cartridge or aerosol-generating system are not the same, the term "width" is used to refer to the larger of the two transverse dimensions perpendicular to the longitudinal axis of the cartridge or aerosol-generating system.

As used herein with reference to the disclosure, the term "elongate" is used to describe a component or portion of a component of the cartridge having a length greater than the width and height thereof.

As described further below, by providing the nicotine source and the acid source in separate compartments with separate air inlets and separate air outlets, cartridges and aerosol-generating systems according to the present disclosure advantageously facilitate control of the reaction stoichiometry between the nicotine and the acid.

The ratio of nicotine and acid required to achieve an appropriate reaction stoichiometry may be controlled and balanced through variation of the volume of the first compartment relative to the volume of the second compartment.

The shape and dimensions of the first compartment of the cartridge may be chosen to allow a desired amount of nicotine to be housed in the cartridge.

The shape and dimensions of the second compartment of the cartridge may be chosen to allow a desired amount of acid to be housed in the cartridge.

Advantageously, the first compartment of the cartridge has a length $L_1$ of between about 8 millimetres and about 40 millimetres, for example of between about 10 millimetres and about 20 millimetres. Advantageously, the first compartment of the cartridge has a width $W_1$ of between about 4 millimetres and about 6 millimetres. Advantageously, the first compartment of the cartridge has a height $H_1$ of between about 0.5 millimetres and about 2.5 millimetres.

The first compartment of the cartridge may have any suitable transverse cross-sectional shape. For example, the transverse cross-sectional shape of the first compartment may be circular, semi-circular, elliptical, triangular, square, rectangular or trapezoidal.

Advantageously, the second compartment of the cartridge has a length $L_2$ of between about 8 millimetres and about 40 millimetres, for example of between about 10 millimetres and about 20 millimetres. Advantageously, the second compartment of the cartridge has a width $W_2$ of between about 4 millimetres and about 6 millimetres. Advantageously, the second compartment of the cartridge has a height $H_2$ of between about 0.5 millimetres and about 2.5 millimetres.

The second compartment of the cartridge may have any suitable transverse cross-sectional shape. For example, the transverse cross-sectional shape of the second compartment may be circular, semi-circular, elliptical, triangular, square, rectangular or trapezoidal.

The shape and dimensions of the first compartment and the second compartment of the cartridge may be the same or different.

Advantageously, the shape and dimensions of the first compartment and the second compartment are substantially the same. Providing a first compartment and a second compartment having of substantially the same shape and dimensions may advantageously simplify manufacturing of the cartridge.

The shape and dimensions of the first compartment of the cartridge may be chosen to allow a desired amount of nicotine to be housed in the cartridge.

The shape and dimensions of the second compartment of the cartridge may be chosen to allow a desired amount of acid to be housed in the cartridge.

As used herein with reference to the disclosure, the term "air inlet" is used to describe one or more apertures through which air may be drawn into a component or portion of a component of the cartridge.

As used herein with reference to the disclosure, the term "air outlet" is used to describe one or more apertures through which air may be drawn out of a component or portion of a component of the cartridge.

The first air inlet of the first compartment of the cartridge and the second air inlet of the second compartment of the cartridge may each comprise one or more apertures. For example, the first air inlet of the first compartment of the cartridge and the second air inlet of the second compartment of the cartridge may each comprise one, two, three, four, five, six or seven apertures. The first air inlet of the first compartment and the second air inlet of the second compartment may comprise the same or different numbers of apertures.

Advantageously, the first air inlet of the first compartment of the cartridge and the second air inlet of the second compartment of the cartridge each comprise a plurality of apertures.

Providing a first compartment having a first air inlet comprising a plurality of apertures and a second compartment having a second air inlet comprising a plurality of apertures may advantageously result in more homogeneous airflow within the first compartment and the second compartment, respectively. In use, this may improve entrainment of nicotine in an air stream drawn through the first compartment and improve entrainment of acid in an air stream drawn through the second compartment.

Advantageously, the first air inlet of the first compartment of the cartridge may comprise between 2 and 5 apertures.

Advantageously, the second air inlet of the second compartment of the cartridge may comprise between 3 and 7 apertures.

The first air inlet of the first compartment of the cartridge may comprise one or more apertures having any suitable cross-sectional shape. For example, the cross-sectional shape of each aperture may be circular, elliptical, square or rectangular. Advantageously, each aperture has a substantially circular cross-sectional shape. Advantageously, the diameter of each aperture is between about 0.2 millimetres and about 0.6 millimetres.

The second air inlet of the second compartment of the cartridge may comprise one or more apertures having any suitable cross-sectional shape. For example, the cross-sectional shape of each aperture may be circular, elliptical, square or rectangular. Advantageously, each aperture has a substantially circular cross-sectional shape. Advantageously, the diameter of each aperture is between about 0.2 millimetres and about 0.6 millimetres.

The first compartment may have a longitudinal first air inlet and the second compartment may have a longitudinal second air inlet. As used herein with reference to the disclosure, the term "longitudinal air inlet" is used to describe one or more apertures through which air may be drawn in a longitudinal direction into a component or portion of a component of the cartridge.

Advantageously, prior to first use of the cartridge, one or both of the first air inlet of the first compartment and the second air inlet of the second compartment may be sealed by one or more removable or frangible barriers. For example, one or both of the first air inlet of the first compartment and the second air inlet of the second compartment may be sealed by one or more peel-off or pierceable seals. The one or more removable or frangible barriers may be formed from any suitable material. For example, the one or more removable or frangible barriers may be formed from a metal foil or film.

The first air outlet of the first compartment of the cartridge and the second air outlet of the second compartment of the cartridge may each comprise one or more apertures. For example, the first air outlet of the first compartment of the cartridge and the second air outlet of the second compartment of the cartridge may each comprise one, two, three, four, five, six or seven apertures.

The first air outlet of the first compartment of the cartridge and the second air outlet of the second compartment of the cartridge may comprise the same or different numbers of apertures.

Advantageously, the first air outlet of the first compartment of the cartridge and the second air outlet of the second compartment of the cartridge may each comprise a plurality of apertures. Providing a first compartment having a first air outlet comprising a plurality of apertures and a second compartment having a second air outlet comprising a plurality of apertures may advantageously result in more homogeneous airflow within the first compartment and the second compartment, respectively. In use, this may improve entrainment of nicotine in an air stream drawn through the first compartment and improve entrainment of acid in an air stream drawn through the second compartment.

In embodiments in which the first air outlet of the first compartment of the cartridge comprises a plurality of apertures, advantageously the first air outlet may comprise between 2 and 5 apertures.

In embodiments in which the second air outlet of the second compartment of the cartridge comprises a plurality of apertures, advantageously, the second air outlet may comprise between 3 and 7 apertures.

Advantageously, the first air outlet of the first compartment of the cartridge of the cartridge assembly and the second air outlet of the second compartment of the cartridge of the cartridge assembly may each comprise a single aperture. Providing a first compartment having a first air outlet comprising a single aperture and a second compartment having a second air outlet comprising a single aperture may advantageously simplify manufacturing of the cartridge.

The first air inlet and the first air outlet of the first compartment of the cartridge may comprise the same or different numbers of apertures.

Advantageously, the first air inlet and the first air outlet of the first compartment of the cartridge comprise the same numbers of apertures. Providing a first compartment having a first air inlet and a first air outlet comprising the same number of apertures may advantageously simplify manufacturing of the cartridge.

The second air inlet and the second air outlet of the second compartment of the cartridge may comprise the same or different numbers of apertures.

Advantageously, the second air inlet and the second air outlet of the second compartment of the cartridge comprise the same numbers of apertures. Providing a second compartment having a second air inlet and a second air outlet comprising the same number of apertures may advantageously simplify manufacturing of the cartridge.

The first air outlet of the first compartment of the cartridge may comprise one or more apertures having any suitable cross-sectional shape. For example, the cross-sectional shape of each aperture may be circular, elliptical, square or rectangular. In embodiments in which the first air outlet of the first compartment of the cartridge comprises a plurality of apertures, advantageously each aperture has a substantially circular cross-sectional shape. In such embodiments, advantageously the diameter of each aperture is between about 0.2 millimetres and about 0.6 millimetres.

The dimensions of the one or more apertures forming the first air inlet of the first compartment of the cartridge may be the same as or different to the dimensions of the one or more apertures forming the first air outlet of the first compartment of the cartridge.

Advantageously, the dimensions of the one or more apertures forming the first air inlet of the first compartment of the cartridge may be substantially the same as the dimensions of the one or more apertures forming the first air outlet of the first compartment of the cartridge. Providing a first compartment having a first air inlet and a first air outlet comprising one or more apertures of substantially the same dimensions may advantageously simplify manufacturing of the cartridge.

Advantageously, the dimensions of the one or more apertures forming the first air outlet of the first compartment of the cartridge may be greater than the dimensions of the one or more apertures forming the first air inlet of the first compartment of the cartridge. Increasing the dimensions of the apertures forming the first air outlet of the first compartment of the cartridge relative to the dimensions of the apertures forming the first air inlet of the first compartment of the cartridge may advantageously reduce the risk of the first air outlet of the first compartment of the cartridge becoming obstructed by, for example, dust.

The second air outlet of the second compartment of the cartridge may comprise one or more apertures having any suitable cross-sectional shape. For example, the cross-sectional shape of each aperture may be circular, elliptical, square or rectangular. In embodiments in which the second air outlet of the second compartment of the cartridge comprises a plurality of apertures, advantageously each aperture has a substantially circular cross-sectional shape. In such embodiments, advantageously the diameter of each aperture is between about 0.2 millimetres and about 0.6 millimetres.

The dimensions of the one or more apertures forming the second air inlet of the second compartment of the cartridge may be the same as or different to the dimensions of the one or more apertures forming the second air outlet of the second compartment of the cartridge.

Advantageously, the dimensions of the one or more apertures forming the second air inlet of the second compartment of the cartridge may be substantially the same as the dimensions of the one or more apertures forming the second air outlet of the second compartment of the cartridge. Providing a second compartment having a second air inlet and a second air outlet comprising one or more apertures of substantially the same dimensions may advantageously simplify manufacturing of the cartridge.

Advantageously, the dimensions of the one or more apertures forming the second air outlet of the second compartment of the cartridge may be greater than the dimensions of the one or more apertures forming the second air inlet of the second compartment of the cartridge. Increasing the dimensions of the apertures forming the second air outlet of the second compartment of the cartridge relative to the dimensions of the apertures forming the second air inlet of the second compartment of the cartridge may advantageously reduce the risk of the second air outlet of the second compartment of the cartridge becoming obstructed by, for example, dust.

Advantageously, the first compartment may have a longitudinal first air outlet and the second compartment has a longitudinal second air outlet.

As used herein with reference to the disclosure, the term "longitudinal air outlet" is used to describe one or more apertures through which air may be drawn in a longitudinal direction out of a component or portion of a component of the cartridge.

Advantageously, prior to first use of the cartridge, one or more of the first air inlet and the first air outlet of the first compartment of the cartridge and the second air inlet and the second air outlet of the second compartment of the cartridge may be sealed by one or more removable or frangible barriers. The one or more removable or frangible barriers may be formed from any suitable material. For example, the one or more removable or frangible barriers may be formed from a metal foil or film.

One or both of the first compartment and the second compartment may comprise one or more features for spacing the carrier material and susceptor element arrangement from the walls of the compartment. Advantageously, spacing the carrier material and susceptor element arrangement from the walls of the compartment may improve airflow over the outer surface of the carrier material in the compartment, when air is drawn through the compartment from the air inlet the distal end to the air outlet at the proximal end. Advantageously, this may improve the release of nicotine or acid vapour from the carrier material and may provide a more consistent release of nicotine or acid vapour from the compartment.

In some embodiments, one or both of the first compartment and the second compartment may comprise one or more projections projecting inwards from the outer wall of the compartment. One or more portions of the carrier material and susceptor element arrangement may abut against the one or more projections in the compartment and neighboring portions of the carrier material and susceptor element arrangement may be held away from the compartment wall by the one or more projections. Where more than one projection are provided in a chamber, an airflow channel may be disposed between adjacent projections that does not contain any of the carrier material and susceptor arrangement.

In some preferred embodiments, the one or more projections may extend substantially the length of the compartment.

In some embodiments, the cartridge may further comprise a third compartment. The third compartment may be downstream of the first compartment and the second compartment and in fluid communication with the first air outlet of the first compartment and the second air outlet of the second compartment. The nicotine vapour in the first air stream may react with the acid vapour in the second air stream in the third compartment to form an aerosol of nicotine salt particles.

In embodiments in which the cartridge further comprises a third compartment, the third compartment may comprise one or more aerosol-modifying agents. For example, the third compartment may comprise one or more sorbents, one or more flavourants, one or more chemesthetic agents or a combination thereof.

Advantageously, the cartridge is an elongate cartridge. In embodiments in which the cartridge is an elongate cartridge, the first compartment and the second compartment of the cartridge may be arranged symmetrically about the longitudinal axis of the cartridge.

The cartridge may have any suitable shape. For example, the cartridge may be substantially cylindrical.

The cartridge may have any suitable transverse cross-sectional shape. For example, the transverse cross-sectional shape of the cartridge may be circular, semi-circular, elliptical, triangular, square, rectangular or trapezoidal.

The cartridge may have any suitable size.

For example, the cartridge may have a length of between about 5 millimetres and about 50 millimetres. Advantageously, the cartridge may have a length between about 10 millimetres and about 20 millimetres.

For example, the cartridge may have a width of between about 4 millimetres and about 10 millimetres and a height of between about 4 millimetres and about 10 millimetres. Advantageously, the cartridge may have a width of between about 6 millimetres and about 8 millimetres and a height of between about 6 millimetres and about 8 millimetres.

Advantageously, the cartridge comprises a body portion and one or more end caps.

The cartridge may comprise a body portion and a distal end cap.

The cartridge may comprise a body portion and a proximal end cap.

The cartridge may comprise a body portion, a distal end cap and a proximal end cap.

In embodiments in which the cartridge comprises a distal end cap, one or more apertures forming the first air inlet of the first compartment of the cartridge and one or more apertures forming the second air inlet of the second compartment of the cartridge may be provided in the distal end cap.

In embodiments in which the cartridge comprises a proximal end cap, one or more apertures forming the first air outlet of the first compartment of the cartridge and one or more apertures forming the second air outlet of the second compartment of the cartridge may be provided in the proximal end cap.

The cartridge may be formed from any suitable material or combination of materials. Suitable materials include, but are not limited to, aluminium, polyether ether ketone (PEEK), polyimides, such as Kapton®, polyethylene terephthalate (PET), polyethylene (PE), high-density polyethylene (HDPE), polypropylene (PP), polystyrene (PS), fluorinated ethylene propylene (FEP), polytetrafluoroethylene (PTFE), polyoxymethylene (POM), epoxy resins, polyurethane resins, vinyl resins, liquid crystal polymers (LCP) and modified LCPs, such as LCPs with graphite or glass fibres.

In embodiments in which the cartridge comprises a body portion and one or more end caps, the body portion and the one or more end caps may be formed from the same or different materials.

The cartridge may be formed from one or more materials that are nicotine-resistant and acid-resistant.

The first compartment of the cartridge may be coated with one or more nicotine-resistant materials and the second compartment of the cartridge may be coated with one or more acid-resistant materials.

Examples of suitable nicotine-resistant materials and acid-resistant materials include, but are not limited to, polyethylene (PE), polypropylene (PP), polystyrene (PS), fluorinated ethylene propylene (FEP), polytetrafluoroethylene (PTFE), epoxy resins, polyurethane resins, vinyl resins and combinations thereof.

Use of one or more nicotine-resistant materials to one or both of form the cartridge and coat the interior of the first compartment of the cartridge may advantageously enhance the shelf life of the cartridge.

Use of one or more acid-resistant materials to one or both of form the cartridge and coat the interior of the second compartment of the cartridge may advantageously enhance the shelf life of the cartridge.

The cartridge may be formed from one or more thermally conductive materials.

The first compartment of the cartridge and the second compartment of the cartridge may be coated with one or more thermally conductive materials.

Use of one or more thermally conductive materials to one or both of form the cartridge and coat the interior of the first compartment and the second compartment of the cartridge may advantageously increase heat transfer from a heater to the nicotine source and the acid source.

Suitable thermally conductive materials include, but are not limited to, metals such as, for example, aluminium, chromium, copper, gold, iron, nickel and silver, alloys, such as brass and steel and combinations thereof.

The cartridge may be formed by any suitable method. Suitable methods include, but are not limited to, deep drawing, injection moulding, blistering, blow forming and extrusion.

The cartridge may be designed to be disposed of once the nicotine in the first compartment and the acid in the second compartment are depleted.

The cartridge may be designed to be refillable.

According to the disclosure there is further provided an aerosol-generating system comprising: a cartridge according to the disclosure; and an aerosol-generating device. The aerosol-generating device may comprise: a housing defining a cavity for receiving at least a portion of the cartridge and an inductive heater arranged at or around the cavity of the aerosol-generating device. The inductive heater may comprise an inductor coil. The inductive heater may comprises a coil surrounding at least a portion of the cavity of the aerosol-generating device. Advantageously, the inductor coil may be arranged to circumscribe at least a portion of the cartridge when the cartridge is received within the cavity. The cavity may have a length and the inductor coil may circumscribe substantially the length of the cavity. Preferably the device further comprises a power supply configured to supply power to the inductive heater. The power supply may be connected to the inductor coil and configured to provide an oscillating current to the inductor coil.

Advantageously, the aerosol-generating system comprises a consumable cartridge assembly according to the disclosure and a reusable aerosol-generating device comprising an inductor coil and a power supply for heating the first compartment and the second compartment of the cartridge.

The aerosol-generating device may advantageously comprise a power supply. The power supply may be within a housing of the device. Typically, the power supply is a battery, such as a lithium iron phosphate battery. However, in some embodiments the power supply may be another form of charge storage device, such as a capacitor. The power supply may require recharging and may have a capacity that allows for the storage of enough energy for one or more user operations, for example one or more aerosol-generating experiences. For example, the power supply may have sufficient capacity to allow for continuous heating of the cartridge for a period of around six minutes, corresponding to the typical time taken to smoke a conventional cigarette, or for a period that is a multiple of six minutes. In another example, the power supply may have sufficient capacity to allow for a predetermined number of puffs or discrete activations of the inductor coil.

The aerosol-generating device may comprise electric circuitry configured to control the supply of power from the power supply to the inductor coil. The electric circuitry may be housed within a housing of the device. The electric circuitry may be connected to the power supply and the inductor coil. The electric circuitry may comprise a microprocessor, which may be a programmable microprocessor, a microcontroller, or an application specific integrated chip (ASIC) or other electronic circuitry capable of providing control. The electric circuitry may comprise further electronic components. The electric circuitry may be configured to regulate a supply of current to the inductor coil. Current may be supplied to the inductor coil continuously following activation of the device or may be supplied intermittently, such as on a puff by puff basis. The electric circuitry may advantageously comprise DC/AC inverter, which may comprise a Class-D or Class-E power amplifier.

The aerosol-generating device may comprise one or more temperature sensors configured to sense a temperature of the cartridge. The aerosol-generating device may comprise one or more temperature sensors configured to sense one or more of a temperature of the first compartment and a temperature of the second compartment of the cartridge. In such embodiments, the controller may be configured to control a supply of power to the inductor coil based on the sensed temperature.

The device comprises a housing. The device housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The aerosol-generating system may further comprise a mouthpiece. In some embodiments, nicotine vapour released from the nicotine source in the first compartment of the cartridge and acid vapour released from the acid source in the second compartment of the cartridge may react with one another in the gas phase in the mouthpiece to form an aerosol of nicotine salt particles.

The mouthpiece may be configured for engagement with the housing of the device. The mouthpiece may be configured for engagement with the cartridge. In some embodiments, cartridge may comprise the mouthpiece. In some embodiments, the mouthpiece may be integrally formed with a body of the cartridge.

In embodiments in which the mouthpiece is configured for engagement with the cartridge or forms part of the cartridge, the combination of the cartridge and the mouthpiece may simulate the shape and dimensions of a combustible smoking article, such as a cigarette, a cigar, or a cigarillo. Advantageously, in such embodiments the combination of the cartridge and the mouthpiece may simulate the shape and dimensions of a cigarette.

The mouthpiece may be configured for engagement with the housing of the aerosol-generating device.

The mouthpiece may be designed to be disposed of once the nicotine in the first compartment and the acid in the second compartment are depleted.

The mouthpiece may be designed to be reusable. In embodiments in which the mouthpiece is designed to be reusable, the mouthpiece may advantageously be configured to be removably attached to the cartridge or the housing of the aerosol-generating device.

The mouthpiece may comprise any suitable material or combination of materials. Examples of suitable materials include thermoplastics that are suitable for food or pharmaceutical applications, for example polypropylene, polyetheretherketone (PEEK) and polyethylene. The mouthpiece may comprise the same material as the cartridge. The mouthpiece and the cartridge may comprise different materials.

For the avoidance of doubt, features described above in relation to one aspect of the disclosure may also be applicable to other aspects of the disclosure. In particular, features described above in relation to the cartridge of the disclosure may also relate, where appropriate, to the aerosol-generating systems of the disclosure, and vice versa.

Embodiments of the disclosure will now be described, by way of example only, with reference to the accompanying drawings, in which:

FIGS. 1 to 6 show schematic illustrations of a cartridge according to an embodiment of the disclosure for use in an aerosol-generating system for generating an aerosol comprising nicotine lactate salt particles.

Figure 1:
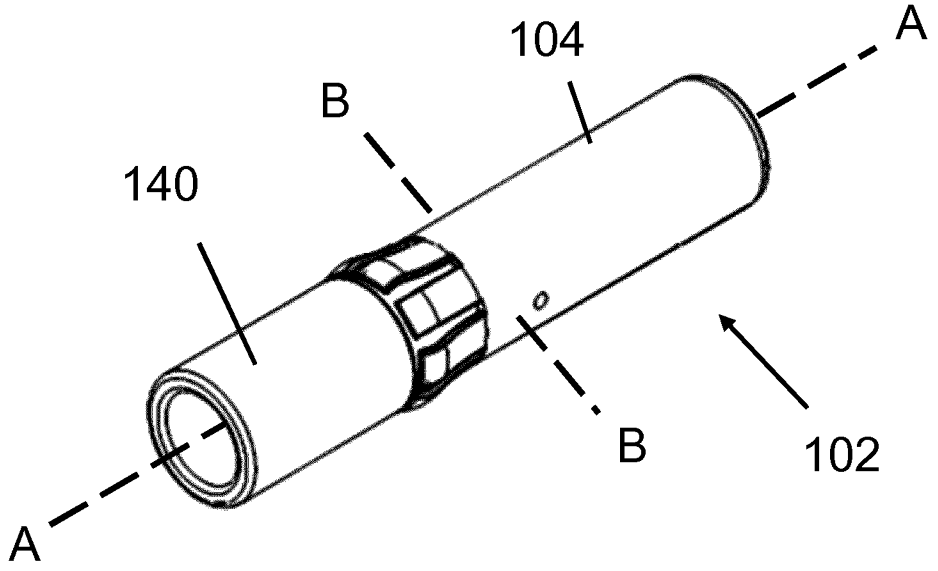
FIG. 1 shows a perspective view of a cartridge according to an embodiment of the present disclosure.
Figure 2:
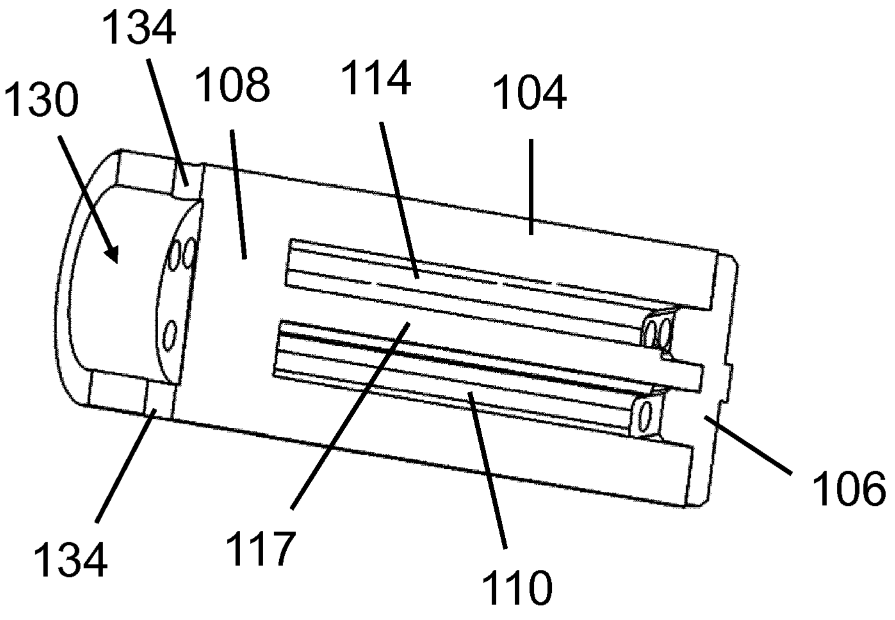
FIG. 2 shows a cross-sectional perspective view of the cartridge portion of the cartridge of FIG. 1 along lines A-A and B-B.
Figure 3:
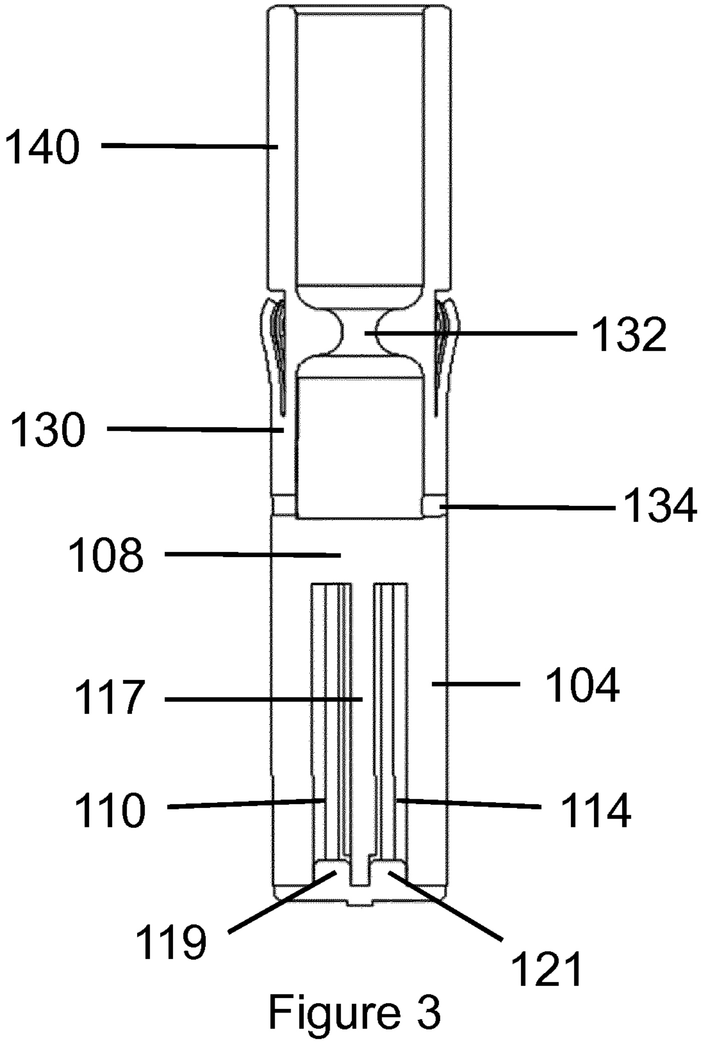
FIG. 3 shows a cross-sectional view of the cartridge of FIG. 1 along the line A-A.

The cartridge 102 comprises an elongate body 104 and a distal end cap 106. The cartridge 102 has a length of about 28 millimetres and a diameter of about 6.9 millimetres.

The cartridge 102 comprises a cartridge portion 105 at a distal end of the cartridge, which extends between the distal end of the body 104 and a proximal end wall 108. The cartridge portion 105 has a length of about 15 millimetres and a diameter of about 6.9 millimetres.

The cartridge portion 105 of the cartridge 102 comprises an elongate first compartment 110 that extends from the distal end of the body 104 to the proximal end wall 108. The first compartment 110 contains a nicotine source and susceptor arrangement 112 in accordance with the present disclosure. The nicotine source comprises a first carrier material impregnated with about 10 milligrams of nicotine and about 4 milligrams of menthol. The susceptor comprises a ferromagnetic stainless steel mesh covering one side of the first carrier material, as will be described in more detail later on.

The cartridge portion 105 of the cartridge 102 also comprises an elongate second compartment 114 that extends from the distal end of the body 104 to the proximal end wall 108. The second compartment 114 contains a lactic acid source and susceptor arrangement 116 in accordance with the present disclosure. The lactic acid source comprises a second carrier material impregnated with about 20 milligrams of lactic acid. The susceptor comprises a ferromagnetic stainless steel mesh covering one side of the second carrier material, as will be described in more detail later on.

The first compartment 110 and the second compartment 114 are arranged in parallel. The first compartment 110 and the second compartment 114 are arranged adjacent to each other, separated by a partition wall 118.

The first compartment 110 and the second compartment 114 are substantially the same shape and size. The first compartment 110 and the second compartment 114 have a length of about 12 millimetres, a width of about 5 millimetres and a height of about 1.7 millimetres.

The first carrier material and the second carrier material comprise a non-woven sheet of PET/PBT and are substantially the same shape and size. The shape and size of the first carrier material and the second carrier material is similar to the shape and size of the first compartment 110 and the second compartment 114 of the cartridge 102, respectively.

Figure 4:
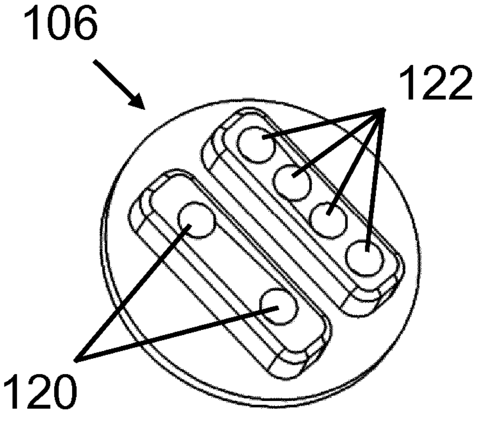
FIG. 4 shows a perspective view of the end cap of the cartridge of FIG. 1.

As shown in FIG. 4, the distal end cap 106 comprises a first elongate raised portion 119 and a second elongate raised portion 121. The first and second elongate raised portions 119, 121 are arranged in parallel and extend out of the plane of the cap 106 in substantially the same direction. The first elongate raised portion 119 is sized and arranged to be received in the open distal end of the first compartment 110 and the second elongate raised portion 121 is sized and arranged to be received in the open distal end of the second compartment 114. The distal end cap 106 further comprises a first air inlet 120 comprising a row of two spaced apart apertures and a second air inlet 122 comprising a row of four spaced apart apertures. The row of apertures of the first air inlet 120 and the row of apertures of the second air inlet 122 are arranged in parallel. The row of apertures of the first air inlet 120 are arranged along the first raised portion 119 and extend through the first raised portion 119. The row of apertures of the second air inlet 122 are arranged along the second raised portion 121 and extend through the second raised portion 121. Each of the apertures forming the first air inlet 120 and the second air inlet 122 is of substantially circular transverse cross-section and has a diameter of about 0.5 millimetres.

Figure 5:
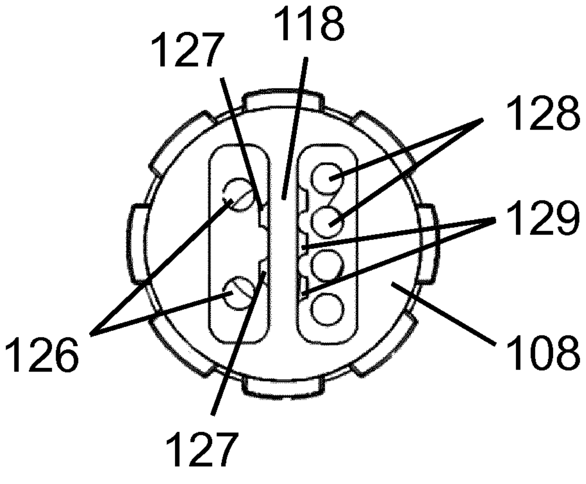
FIG. 5 shows cross-sectional plan view of the cartridge portion of the cartridge of FIG. 1, along the line B-B.

As shown in FIG. 5, the proximal end wall 108 of the cartridge portion 105 comprises a first air outlet 126 comprising a row of two spaced apart apertures and a second air outlet 128 comprising a row of four spaced apart apertures. The first air outlet 126 is aligned with the first compartment 110 and the second air outlet 128 is aligned with the second compartment 114. Each of the apertures forming the first air outlet 126 and the second air outlet 128 is of substantially circular transverse cross-section and has a diameter of about 0.5 millimetres.

Also as shown in FIG. 5, the first compartment 110 comprises two protrusions or ribs 127 protruding from the partition wall 118 towards the opposite side of the chamber 110. The protrusions 127 of the first chamber 110 extend substantially the length of the first compartment 110 and are spaced apart such that an air channel forms between the protrusions. The second compartment 114 comprises three protrusions or ribs 129 protruding from the partition wall 118 towards the opposite side of the chamber 114. The protrusions 129 of the second chamber 114 are substantially similar to the protrusions of the first chamber 110, having the same width and extending substantially the length of the second chamber 114. The protrusions 129 of the second chamber 124 are spaced apart such that two air channels are formed between them, one air channel between each of the adjacent protrusions. The protrusions 127 of the first chamber 110 and the protrusions 129 of the second chamber 114 are provided to space the first and second carrier material and susceptor arrangements 112, 116 from the partition wall 118, to ensure sufficient airflow over the outer surface of the carrier material and susceptor arrangements at least on one side.

Figure 6:
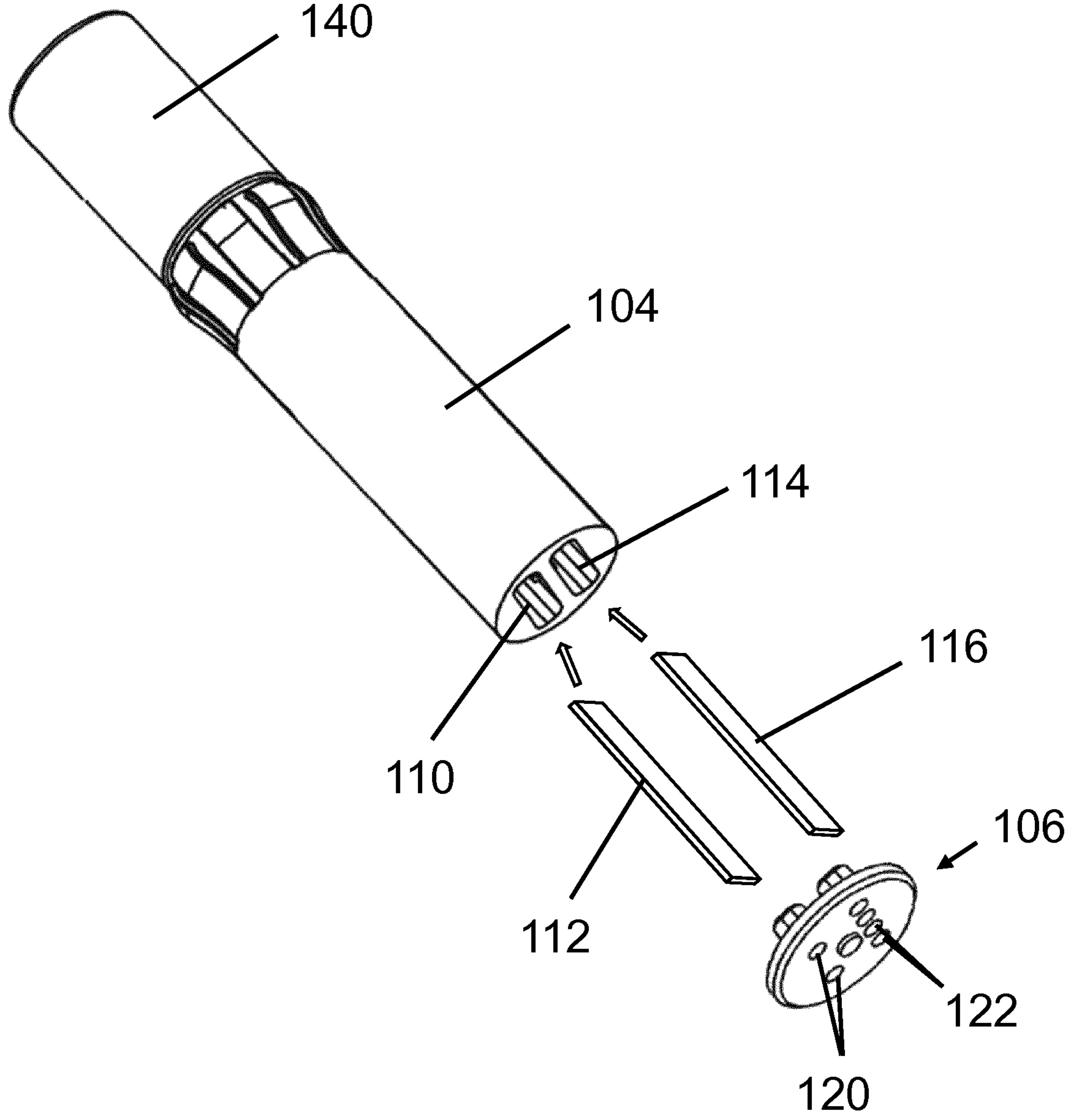
FIG. 6 shows a partially exploded perspective view of the cartridge of FIG. 1, including the nicotine source and susceptor arrangement and the lactic acid source and susceptor arrangement.

As shown in FIG. 6, to form the cartridge 102, the first carrier material is impregnated with nicotine and menthol and the first carrier material and susceptor arrangement 112 is inserted into the first compartment 110 and the second carrier material is impregnated with lactic acid and the second carrier material and susceptor arrangement 116 is inserted into the second compartment 114. The distal end cap 106 is then inserted onto the distal end of the body 104 such that the first air inlet 120 is aligned with the first compartment 110 and the second air inlet 122 is aligned with the second compartment 114.

The first air inlet 120 is in fluid communication with the first air outlet 126 so that a first air stream may pass into the cartridge 102 through the first air inlet 120, through the first compartment 110 and out of the cartridge 102 though the first air outlet 126. The second air inlet 122 is in fluid communication with the second air outlet 128 so that a second air stream may pass into the cartridge 102 through the second air inlet 122, through the second compartment 114 and out of the cartridge 102 though the second air outlet 128.

Prior to first use of the cartridge 102, the first air inlet 120 and the second air inlet 122 may be sealed by a removable peel-off foil seal or a pierceable foil seal (not shown) applied to the external face of the distal end cap 106. Similarly, prior to first use of the cartridge 102, the first air outlet 126 and the second air outlet 128 may be sealed by a removable peel-off foil seal or a pierceable foil seal (not shown) applied to the external face of the proximal end wall of the body 104.

The cartridge 102 further comprises a third compartment 130 downstream of the first compartment 110 and the second compartment 114 and in fluid communication with the first air outlet 120 of the first compartment 110 and the second air outlet 122 of the second compartment 114. During use, the nicotine vapour in the first air stream react with the acid vapour in the second air stream in the third compartment 130 to form an aerosol of nicotine salt particles.

The third compartment 130 comprises a single opening 132 at the proximal end of the compartment, with a diameter of about 1.3 millimetres. The third compartment 130 also comprises a ventilation inlet 132 to allow external air to enter the third compartment and dilute the nicotine, acid and nicotine lactate salt vapours. The ventilation inlet has a diameter of about 0.5 millimetres.

The cartridge 102 also comprises a mouthpiece portion 140 downstream of the third compartment 130 and in fluid communication with the opening 132 at the proximal end of the third compartment 130. The mouthpiece portion 140 has a length of about 13 millimetres and an opening at the proximal end of the cartridge 102 with a diameter of about 5 millimetres.

In use, a user draws on the mouthpiece portion 140 of the cartridge 102 to draw air through the first and second compartments 110, 112 into the third compartment 130, through the third compartment 130 into the mouthpiece portion 140 and out of the mouthpiece portion 140 through the opening at the proximal end.

Figure 7:
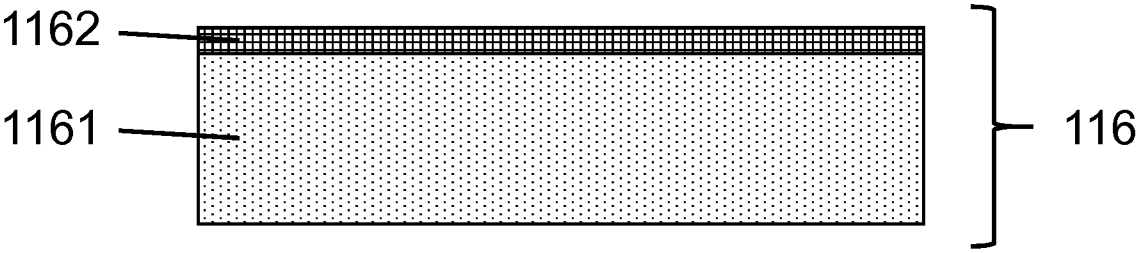
FIG. 7 shows a side view of a carrier material and susceptor arrangement according to a first embodiment of the present disclosure.
Figure 8:
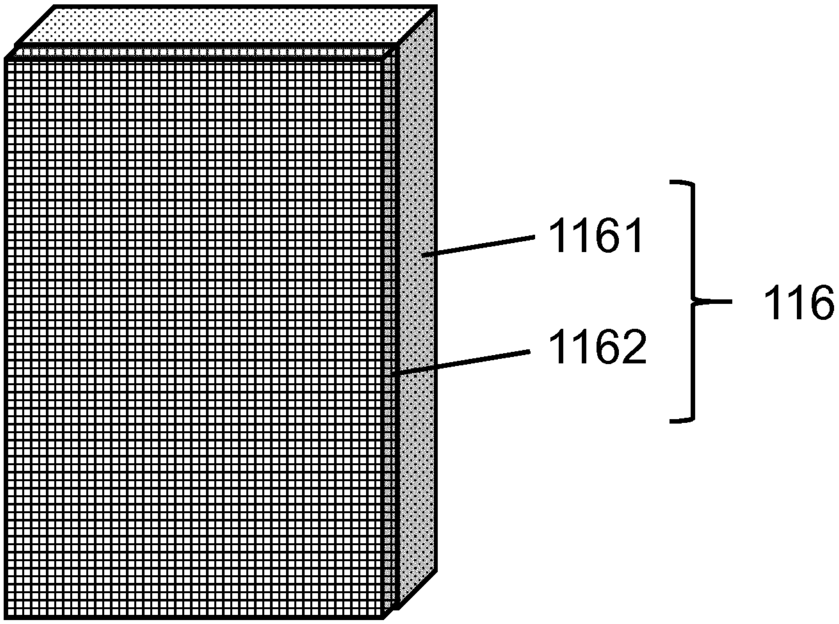
FIG. 8 shows a perspective view of the carrier material and susceptor arrangement of FIG. 7.
Figure 9:
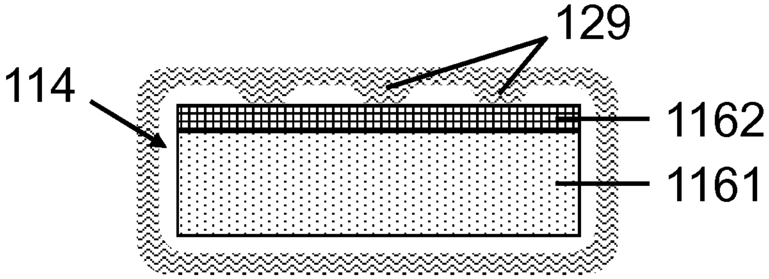
FIG. 9 shows a cross-sectional side view of the carrier material and susceptor arrangement of FIG. 7 within a chamber of the cartridge of FIG. 1.

FIGS. 7 to 9 show schematic illustrations of a second carrier material and susceptor element arrangement according to a first embodiment of the present disclosure. Although only the second carrier material and susceptor arrangement for the second compartment are shown here, it will be appreciated that the same carrier material and susceptor element arrangement may be provided for the first carrier material and susceptor element arrangement for the first compartment.

FIGS. 7 and 8 show a second carrier material and susceptor element arrangement 116 comprising a carrier material 1161 and a ferrous mesh susceptor element 1162. The mesh susceptor element 1162 is in direct contact with the carrier material 1161. The ferrous mesh susceptor element 1162 is directly deposited onto the carrier material 1161, by any suitable method known in the art, such that the ferrous mesh susceptor element 1162 is in direct contact with the carrier material 1161. In this embodiment, the ferrous mesh susceptor element 1162 is formed from ANSI 420 stainless steel, has filaments with a diameter of about 50 micrometres and mesh dimensions of about 400 Mesh US.

In this embodiment, the carrier material 1161 is elongate and substantially planar, having two large, opposing planar faces. The ferrous mesh susceptor element 1162 is deposited over substantially one of the two large, opposing planar faces of the carrier material, and as such the mesh susceptor element 1162 covers and is in contact with at least 40 percent of the surface area of the carrier material 1161.

FIG. 9 shows the second carrier material and susceptor arrangement 116 of FIGS. 7 and 8 within the second compartment 114 of the cartridge 102 of FIGS. 1 to 6. As shown in FIG. 9, the second compartment 114 comprises the three protrusions or ribs 129 spaced evenly along one side of the compartment. The second carrier material and susceptor arrangement 116 is arranged in the compartment such that the susceptor element 1162 abuts or contacts the protrusions 129 and is spaced from the compartment wall by the protrusions 129. This configuration provides air channels between adjacent protrusions 129 and the susceptor, ensuring sufficient airflow over the susceptor element 1162 when air is drawn through the second compartment 114.

Figure 10:
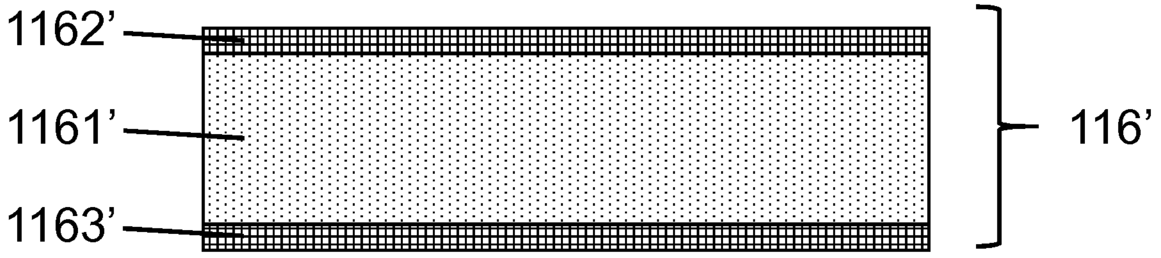
FIG. 10 shows a side view of a carrier material and susceptor arrangement according to a second embodiment of the present disclosure.
Figure 11:
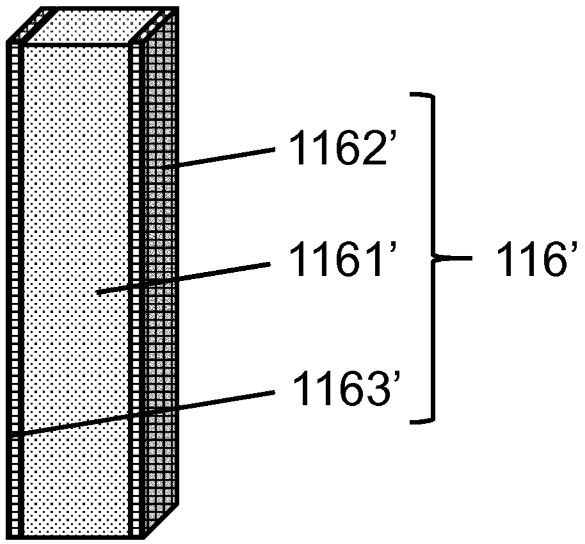
FIG. 11 shows a perspective view of the carrier material and susceptor arrangement of FIG. 10.
Figure 12:
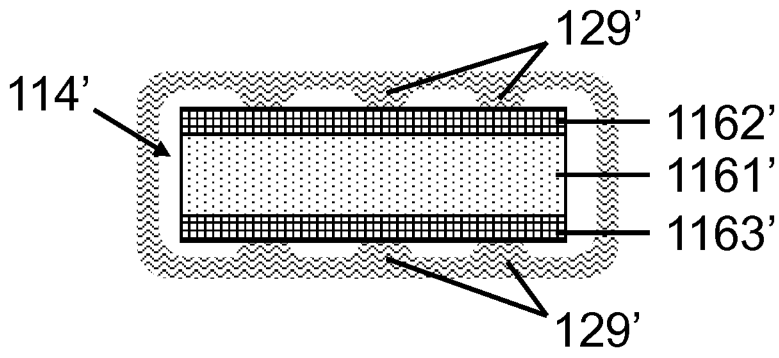
FIG. 12 shows a cross-sectional side view of the carrier material and susceptor arrangement of FIG. 10 within a chamber of the cartridge of FIG. 1.

FIGS. 10 to 12 show schematic illustrations of a second carrier material and susceptor arrangement according to a second embodiment of the present disclosure. Although only the second carrier material and susceptor arrangement for the second compartment are shown here, it will be appreciated that the same carrier material and susceptor element arrangement may be provided for the first carrier material and susceptor element arrangement for the first compartment.

FIGS. 10 and 11 show a second carrier material and susceptor element arrangement 116' comprising a carrier material 1161' and a pair of ferrous mesh susceptor elements 1162', 1163'. The mesh susceptor elements 1162', 1163' are in direct contact with the carrier material 1161'. The ferrous mesh susceptor elements 1162', 1163' are directly deposited onto the carrier material 1161', by any suitable method known in the art, such that the ferrous mesh susceptor elements 1162', 1163' are in direct contact with the carrier material 1161'. In this embodiment, both ferrous mesh susceptor elements 1162', 1163' are formed from ANSI 420 stainless steel, have filaments with a diameter of about 50 micrometres and mesh dimensions of about 400 Mesh US.

In this embodiment, the carrier material 1161 is elongate and substantially planar, having two large, opposing planar faces. The first mesh susceptor element 1162' is deposited over substantially one of the two large, opposing planar faces of the carrier material 1161', and as such the first mesh susceptor element 1162 covers and is in contact with at least 40 percent of the surface area of the carrier material 1161'. The second mesh susceptor element 1163' is deposited over substantially the other one of the two large, opposing planar faces of the carrier material 1161', and as such the second mesh susceptor element 1163' covers and is in contact with at least 40 percent of the surface area of the carrier material 1161'. In this arrangement at least 80 percent of the surface area of the carrier material 1161' is in contact with a susceptor element.

FIG. 9 shows the second carrier material and susceptor arrangement 116' of FIGS. 10 and 11 within a second compartment 114' of a cartridge 102'. The cartridge 102' is identical to the cartridge 102 of FIGS. 1 to 6, but comprises six protrusions or ribs 129', three protrusions spaced evenly along one side of the compartment and three protrusions spaced evenly along the opposite side of the compartment. The second carrier material and susceptor arrangement 116' is arranged in the compartment such that the first mesh susceptor element 1162' abuts or contacts three protrusions 129' on one side of the compartment and the second mesh susceptor element 1163' abuts or contacts three protrusions 129' on the opposite side of the compartment. In this arrangement both susceptor elements 1162', 1163' are spaced from the walls of the compartment by the protrusions 129'. This configuration provides air channels between adjacent protrusions 129' and the susceptor elements, ensuring sufficient airflow over the susceptor elements 1162', 1163' when air is drawn through the second compartment 114'.

Figure 13:
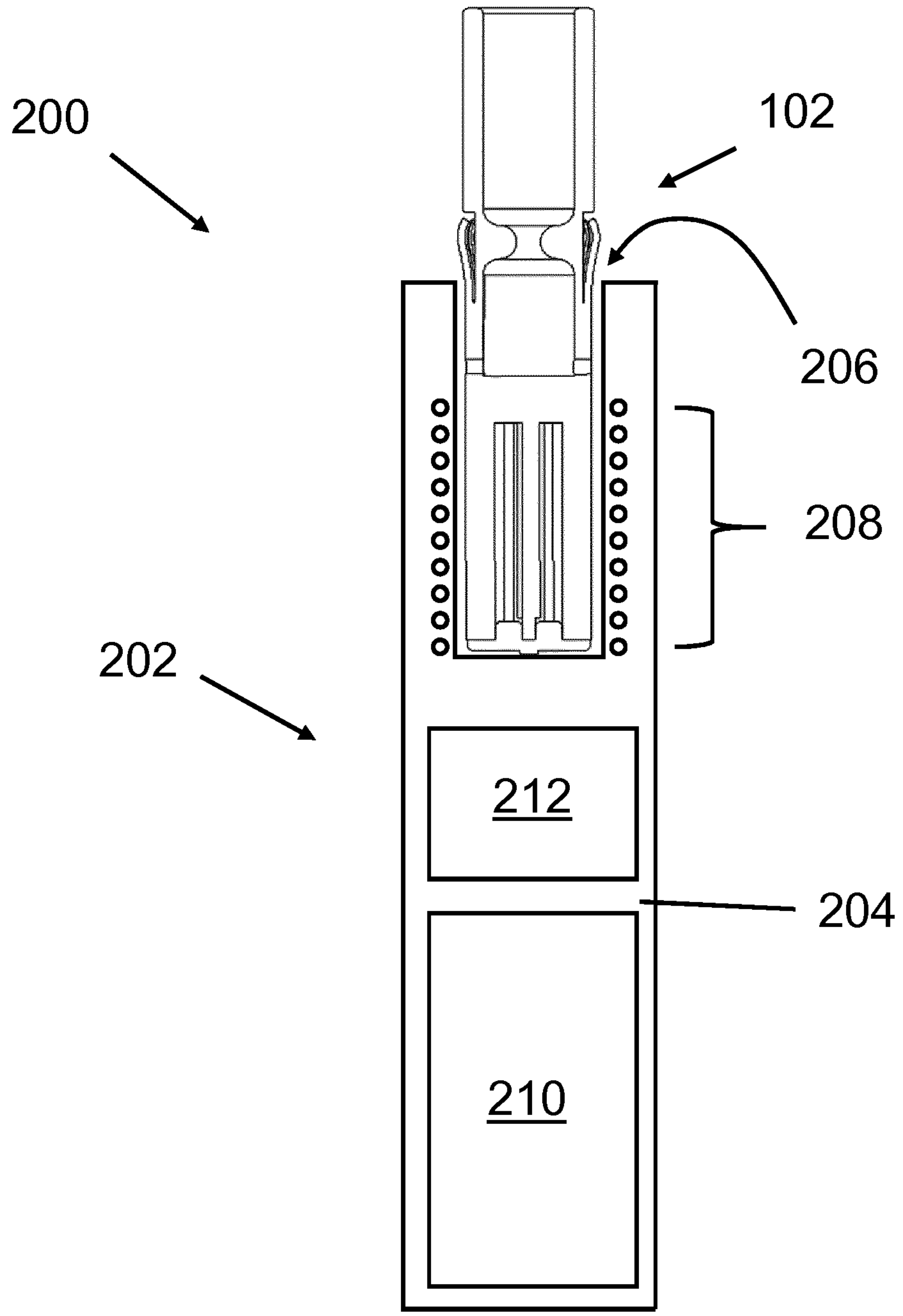
FIG. 13 shows an embodiment of an aerosol-generating system according to the present disclosure having the cartridge of FIG. 1 and an aerosol-generating device.

FIG. 13 shows a schematic illustration of an aerosol-generating system 200 according to an embodiment of the disclosure for generating an aerosol comprising nicotine lactate salt particles.

The aerosol-generating system comprises an aerosol-generating device 202 and a cartridge 102 according the embodiment of the disclosure shown in FIGS. 1 to 6.

The aerosol-generating device 202 comprises a housing 204 defining a cavity 206 at a proximal end of the housing 204 for receiving the distal portion of the cartridge 102 between the distal end cap 106 and the proximal end wall 108.

An inductor coil 208 is provided along the length of the cavity 206, and is coaxially aligned with the cavity 206 such that the coil 208 substantially circumscribes the cavity. When the cartridge 102 is received in the cavity 206, the inductor coil 208 extends along the length of the first and second compartments 110, 114.

The aerosol-generating device 202 further comprises a power supply 210 and control circuitry 212 housed within the housing 204. The power supply 210 is connected to the inductor coil 208 via the control circuitry 212 and the control circuitry is configured to control the supply of power supplied to the inductor coil 208 from the power supply 210.

The power supply 210 is configured to provide a high frequency oscillating current to the inductor coil 208, with a frequency of between about 5 and about 7 MHz. In operation, the high frequency oscillating current is passed through the inductor coil 208 to generate an alternating magnetic field that induces a voltage in the susceptor elements. The induced voltage causes a current to flow in the susceptor elements and this current causes Joule heating of the susceptor elements that in turn heats the nicotine in the first chamber 210 and the acid in the second chambers 212. During use, the control circuitry 212 of the aerosol-generating device 202 controls the supply of power from the power supply 210 aerosol-generating device 202 to the inductor coil 208 to heat the susceptor in the first compartment 110 and the susceptor in the second compartment 114 of the cartridge 102 to substantially the same temperature of about 100° C.

When the cartridge 102 has been inserted into the cavity 206 of the aerosol-generating device 202, the mouthpiece 140 extends out of the cavity 206 such that a user may access the mouthpiece 140 to draw on the proximal end and receive an aerosol of nicotine lactate salt particles.

The device 202 comprises a switch (not shown). In use, a user presses the switch to turn on the device 202. When the device is turned on, the control circuitry 212 supplies an oscillating current from the power supply 210 to the inductor coil 208 to heat the susceptor elements in the first and second compartments of the cartridge 102. The system 200 requires the temperature of the first and second compartments to be increased to an operating temperature of around 100 degrees Celsius before a user may take a first puff on the device. This is to ensure consistent aerosol of nicotine lactate salt particles is generated. In this embodiment, the preheating time is around 5 seconds, if the system 200 is heated from an ambient room temperature of 20 degrees Celsius. After the preheating time, when the first and second compartments are at an operating temperature of around 100 degrees Celsius, a user may take a first puff on the mouthpiece 140 of the cartridge 102. When taking a puff, the user draws on the proximal end of the mouthpiece 140 to draw a first air stream through the first compartment 110 of the cartridge 102 and a second air stream through the second compartment 114 of the cartridge 102. As the first air stream is drawn through the first compartment 110 of the cartridge 102, nicotine vapour is released from the first carrier material into the first air stream. As the second air stream is drawn through the second compartment 114 of the cartridge 102, lactic acid vapour is released from the second carrier material into the second air stream. The nicotine vapour in the first air stream and the lactic acid vapour in the second air stream are drawn from the first and second compartments into the third compartment 130. Ambient air is also drawn into the third compartment 130 via the ventilation inlet 134. In the third compartment 130 the nicotine vapour from the first air stream and the lactic acid vapour in the second air stream react with one another in the gas phase to form an aerosol of nicotine salt particles. The aerosol of nicotine salt particles is drawn out of the third compartment 130 through the proximal opening 132 into the mouthpiece 140 and is delivered to the user through the proximal end of the mouthpiece 140.

Figure 14:
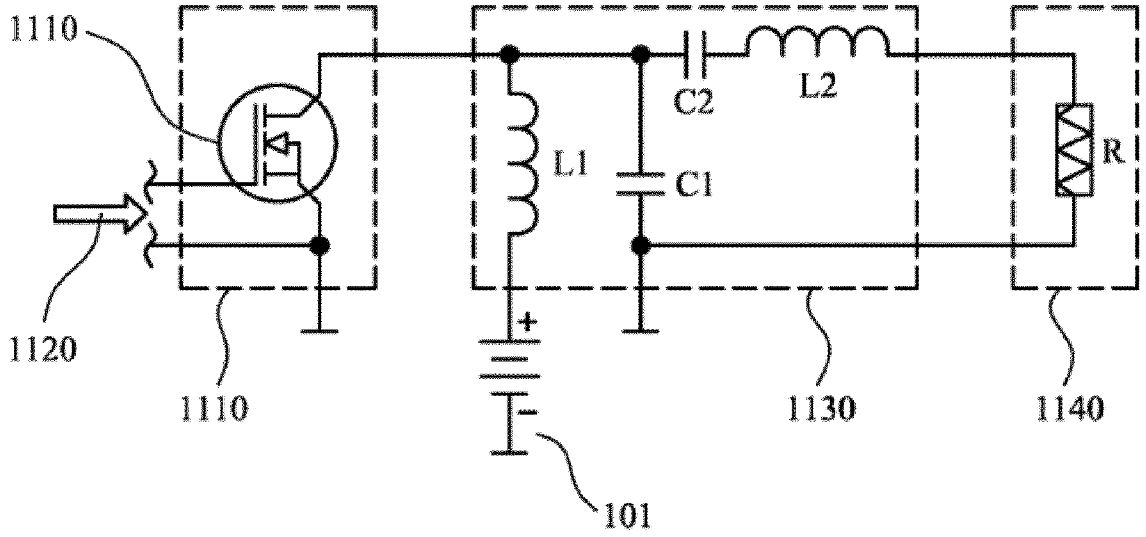
FIG. 14 shows an embodiment of control circuitry for the device of FIG. 11.

FIG. 14 illustrates an example of a control circuit 212 that may be used to provide a high frequency oscillating current to the inductor coil, using a Class-E power amplifier. As can be seen from FIG. 14, the circuit includes a Class-E power amplifier including a transistor switch 1100 comprising a Field Effect Transistor (FET) 1110, for example a Metal-Oxide-Semiconductor Field Effect Transistor (MOSFET), a transistor switch supply circuit indicated by the arrow 1120 for supplying the switching signal (gate-source voltage) to the FET 1110, and an LC load network 1130 comprising a shunt capacitor C1 and a series connection of a capacitor C2 and inductor coil L2. The DC power source, which comprises the battery 101, includes a choke L1, and supplies a DC supply voltage. Also shown in FIG. 14 is the ohmic resistance R representing the total ohmic load 1140, which is the sum of the ohmic resistance $R_{Coil}$ of the flat spiral inductor coil, marked as L2, and the ohmic resistance $R_{Load}$ of the susceptor element.

Due to the very low number of components the volume of the power supply electronics can be kept extremely small. This extremely small volume of the power supply electronics is possible due to the inductor L2 of the LC load network 1130 being directly used as the inductor for the inductive coupling to the susceptor element, and this small volume allows the overall dimensions of the entire inductive heating device to be kept small.

The general operating principle of the Class-E power amplifier is known and is described in detail in "Class-E RF Power Amplifiers", Nathan O. Sokal, published in the bimonthly magazine QEX, edition January/February 2001, pages 9-20, of the American Radio Relay League (ARRL), Newington, CT, U.S.A., and in WO 2015/177043 A1, in the name of Philip Morris Products S.A.

Although a Class-E power amplifier is preferred for most systems in accordance with the disclosure, it is also possible to use other circuit architectures, such as circuit architectures including a Class-D power amplifier, as also described in WO 2015/177043 A1, in the name of Philip Morris Products S.A.

The susceptor element can be made of a material or of a combination of materials having a Curie temperature which is close to the desired temperature to which the susceptor element should be heated. Once the temperature of the susceptor element exceeds this Curie temperature, the material changes its ferromagnetic properties to paramagnetic properties. Accordingly, the energy dissipation in the susceptor element is significantly reduced since the hysteresis losses of the material having paramagnetic properties are much lower than those of the material having the ferromagnetic properties. This reduced power dissipation in the susceptor element can be detected and, for example, the generation of AC power by the DC/AC inverter may then be interrupted until the susceptor element has cooled down below the Curie temperature again and has regained its ferromagnetic properties. Generation of AC power by the DC/AC inverter may then be resumed again.

Other cartridge designs incorporating susceptor elements in accordance with this disclosure can now be conceived by one of ordinary skill in the art. For example, the cartridge may not include a mouthpiece portion, but rather the device may include a mouthpiece portion. The mouthpiece portion may have any desired shape. Furthermore, a coil and susceptor arrangement in accordance with the disclosure may be used in systems of other types to those already described, such as humidifiers, air fresheners, and other aerosol-generating systems comprising cartridges.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A cartridge for an aerosol-generating system, the cartridge comprising:

a first compartment having a first air inlet and a first air outlet, the first compartment containing a nicotine source comprising a first carrier material impregnated with nicotine;

a second compartment having a second air inlet and a second air outlet, the second compartment containing an acid source comprising a second carrier material impregnated with an acid, wherein one of the first and the second compartments comprises a pair of susceptor elements arranged in contact with the first and the second carrier materials, respectively, within the first and the second compartments, respectively, wherein the first and the second carrier materials are respectively arranged between the pair of susceptor elements, and wherein the first compartment and the second compartment are arranged in parallel within the cartridge; and further comprising a third compartment in fluid communication with the first air outlet of the first compartment and the second air outlet of the second compartment.

2. The cartridge according to claim 1, wherein at least one susceptor element of the pair of susceptor elements comprises a foil strip.

3. The cartridge according to claim 1, wherein at least one susceptor element of the pair of susceptor elements comprises a mesh.

4. The cartridge according to claim 1, wherein at least one susceptor element of the pair of susceptor elements comprises a ferromagnetic stainless steel.

5. The cartridge according to claim 1, wherein:

the first compartment comprises a first susceptor element in contact with the first carrier material, and the second compartment comprises a second susceptor element in contact with the second carrier material.

6. The cartridge according to claim 5, wherein:

the first susceptor further comprises a first pair of susceptor elements, each susceptor element of the first pair of susceptor elements being in contact with the first carrier material, and the first carrier material being arranged between the first pair of susceptor elements, and the second susceptor further comprises a second pair of susceptor elements, each susceptor element of the second pair of susceptor elements being in contact with the second carrier material, and the second carrier material being arranged between the second pair of susceptor elements.

7. The cartridge according to claim 1, wherein at least one susceptor element of the pair of susceptor elements comprises a mesh.

8. The cartridge according to claim 7, wherein the pair of susceptor elements comprises a mesh.

9. The cartridge according to claim 1, wherein the acid comprises lactic acid.

10. The cartridge according to claim 1, wherein the first carrier material is impregnated with the nicotine and a flavourant.

11. An aerosol-generating system, comprising:

a cartridge according to claim 1; and an aerosol-generating device comprising:

a housing defining a cavity configured to receive at least a portion of the cartridge, and an inductive heater arranged at or around the cavity of the aerosol-generating device.

12. The aerosol-generating system according to claim 11, wherein the inductive heater comprises an inductor coil surrounding at least a portion of the cavity of the aerosol-generating device.

* * * * *